United States Patent
Carmichael

(10) Patent No.: US 6,203,204 B1
(45) Date of Patent: Mar. 20, 2001

(54) WHEEL BEARING ASSEMBLY WITH INTEGRAL SENSOR ELEMENT FOR DETECTING ROTARY OR ANGULAR MOVEMENTS

(75) Inventor: Robert P. Carmichael, Ortonville, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/346,449

(22) Filed: Jul. 1, 1999

Related U.S. Application Data

(60) Provisional application No. 60/091,443, filed on Jul. 1, 1998.

(51) Int. Cl.$^7$ .............................. F16C 32/00; F16C 41/04
(52) U.S. Cl. ............................................................. 384/448
(58) Field of Search ............................................. 384/448

(56) References Cited

U.S. PATENT DOCUMENTS

| | | | |
|---|---|---|---|
| 5,332,964 | * 7/1994 | Ouchi | .................................... 384/448 |
| 5,642,042 | 6/1997 | Goossens et al. | . |
| 5,851,074 | * 12/1998 | Sakamoto | .............................. 384/448 |
| 5,920,193 | * 7/1999 | Tola et al. | ............................. 384/448 |
| 5,938,346 | * 8/1999 | Ouchi | .................................... 384/448 |
| 6,011,388 | * 1/2000 | Miyazaki et al. | ..................... 384/448 |

* cited by examiner

Primary Examiner—Dirk Wright
(74) Attorney, Agent, or Firm—Rader, Fishman & Grauer PLLC

(57) ABSTRACT

A wheel bearing assembly is provided that includes a tone wheel fixedly connected to a wheel axle so as to rotate with the wheel axle and a wheel bearing cap that is mounted over the end of the wheel axle such that the tone wheel freely rotates within a cavity defined by the wheel bearing cap. The wheel bearing cap further includes a sensor element that is molded to a mounting member that is integral with the wheel bearing cap. When the wheel bearing cap is connected to mating components of the wheel bearing assembly, the sensor element is positioned adjacent data generating sections that are disposed on the tone wheel to detect rotary and angular motions.

18 Claims, 3 Drawing Sheets

WHEEL BEARING ASSEMBLY WITH INTEGRAL SENSOR ELEMENT FOR DETECTING ROTARY OR ANGULAR MOVEMENTS

This application claims Provisional of application Ser. No. 60/091,443, filed Jul. 1, 1998.

FIELD OF THE INVENTION

The present invention relates to a detection system used for measuring rotary or angular motions. More particularly, the invention relates to a wheel bearing cap for a wheel bearing assembly that incorporates an integral sensor element that cooperates with a tone wheel to detect rotary and angular motions.

BACKGROUND OF THE INVENTION

Measuring rotary and angular motions, and, in particular, the speed and the rotational behavior of individual wheels on a vehicle is of great importance in connection with automotive vehicle control systems for anti-lock control brake systems (hereinafter ABS), traction slip control, and suspension control, etc. Sensors for these types of applications must be durable, reliable, inexpensive to manufacture, easy to assembly easy to diagnose, replace and maintain.

There are a number of sensor types and sensor designs that are available for detecting rotary and angular motion of vehicle wheels. For example, in some commercially available vehicles with electronically controlled anti-lock and traction slip control systems, an incremental encoder, which is coupled mechanically to the vehicle wheel, cooperates with a transducer or sensor to collect positioning data for the vehicle wheel.

In known applications, the sensor is connected to a bearing dust cap by clips, bolts or other known fasteners. These methods of attachment is undesirable as it increases the number of components for the bearing assembly, translating into increased costs. Further, packaging concerns arise as it is necessary to provide additional space within the dust cap to properly accommodate the fasteners necessary to secure the sensor. As a result, positioning space for accommodating the encoder is undesirably limited, such that substantial packaging constraints for the encoder arise. Accordingly, the diameter of the encoder must be limited to insure proper operation of the encoder.

SUMMARY OF THE INVENTION

An object of the present invention is to provide a sensor that cooperates with a tone wheel for detecting rotary and angular motion that is assembled to a wheel bearing cap such that the number of components is minimized. It is further object of the invention to provide a wheel bearing assembly that permits maximum tone wheel diameters to be used in a wheel bearing cap. These objects are accomplished by providing a wheel bearing cap that has a sensor element integrally connected a mounting member within the wheel bearing cap. In a preferred embodiment, the wheel bearing cap is a one-piece unit that includes an annular wall, a cover member, a mounting member and a terminal housing. The sensor element is welded to connector pins and then overmolded into the mounting member of the wheel bearing cap with a sensing face being flush with a surface of the wheel bearing cap.

In one preferred embodiment, the mounting member is L-shaped with the sensing face being positioned on one leg of the mounting member and flush with an interior surface of the mounting member. In another preferred embodiment, the sensing face is positioned adjacent the mounting member with the sensing face flush with the interior surface of the annular wall of the wheel bearing cap.

In operation, a tone wheel is fixedly connected to a wheel axle so as to rotate with the wheel axle. The wheel bearing cap is then fixedly secured to mating components of the wheel bearing assembly with cap serving as a cavity in which the tone wheel rotates. The sensing face, which is flush with an interior surface of the cap, is operatively positioned adjacent data generating sections that are disposed on the tone wheel. Thus, as the tone wheel rotates, sensor captures data regarding rotational and angular motions. Because the sensor is integrally molded to the wheel bearing cap, the number of components is reduced, translating into reduced manufacturing costs.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 1:
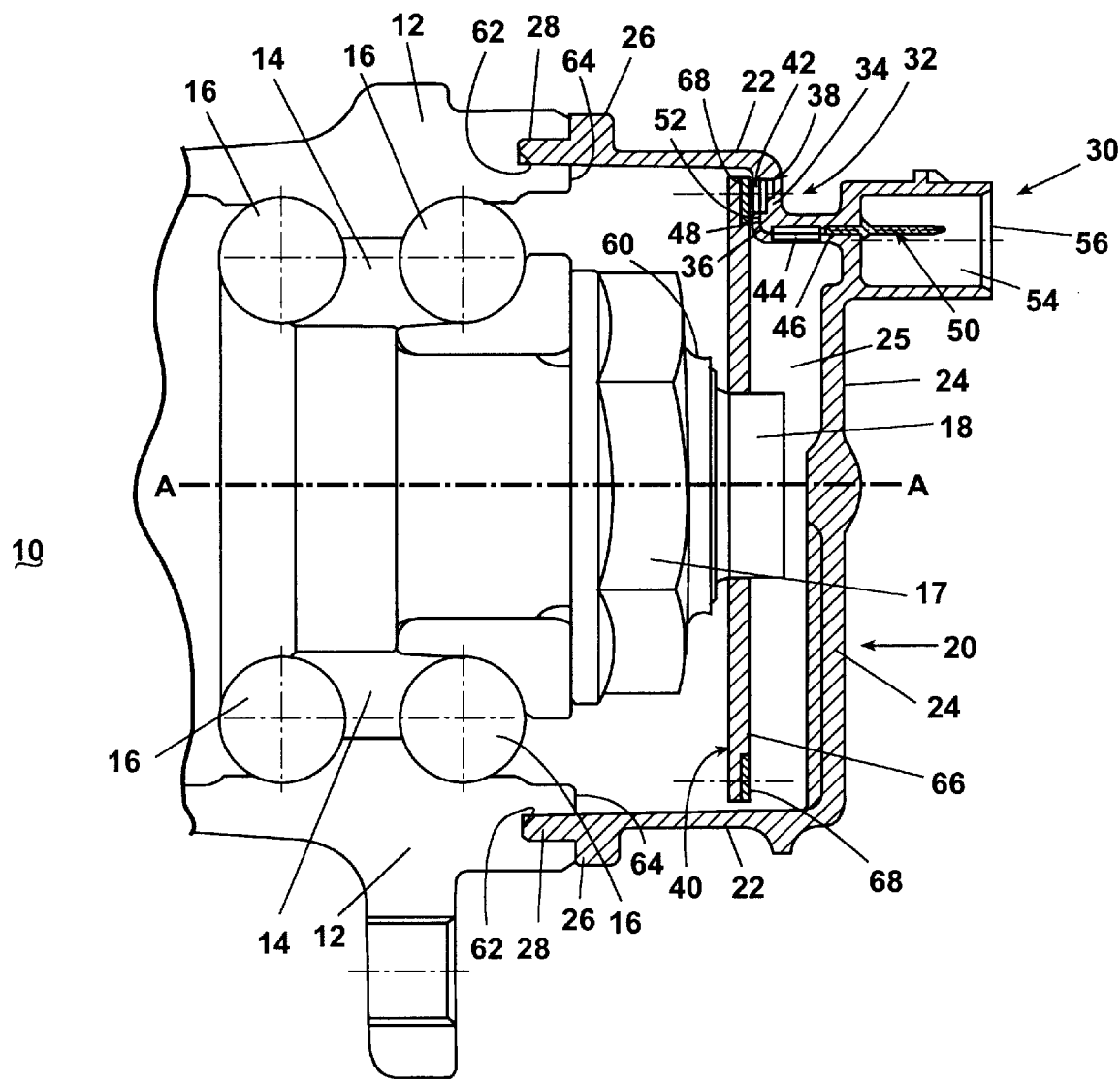
FIG. 1 is a longitudinal cross-sectional view of a wheel bearing assembly including a wheel bearing cap having an integral sensor that cooperates with a tone wheel to detect rotary and angular motion in accordance with the present invention.
Figure 2:
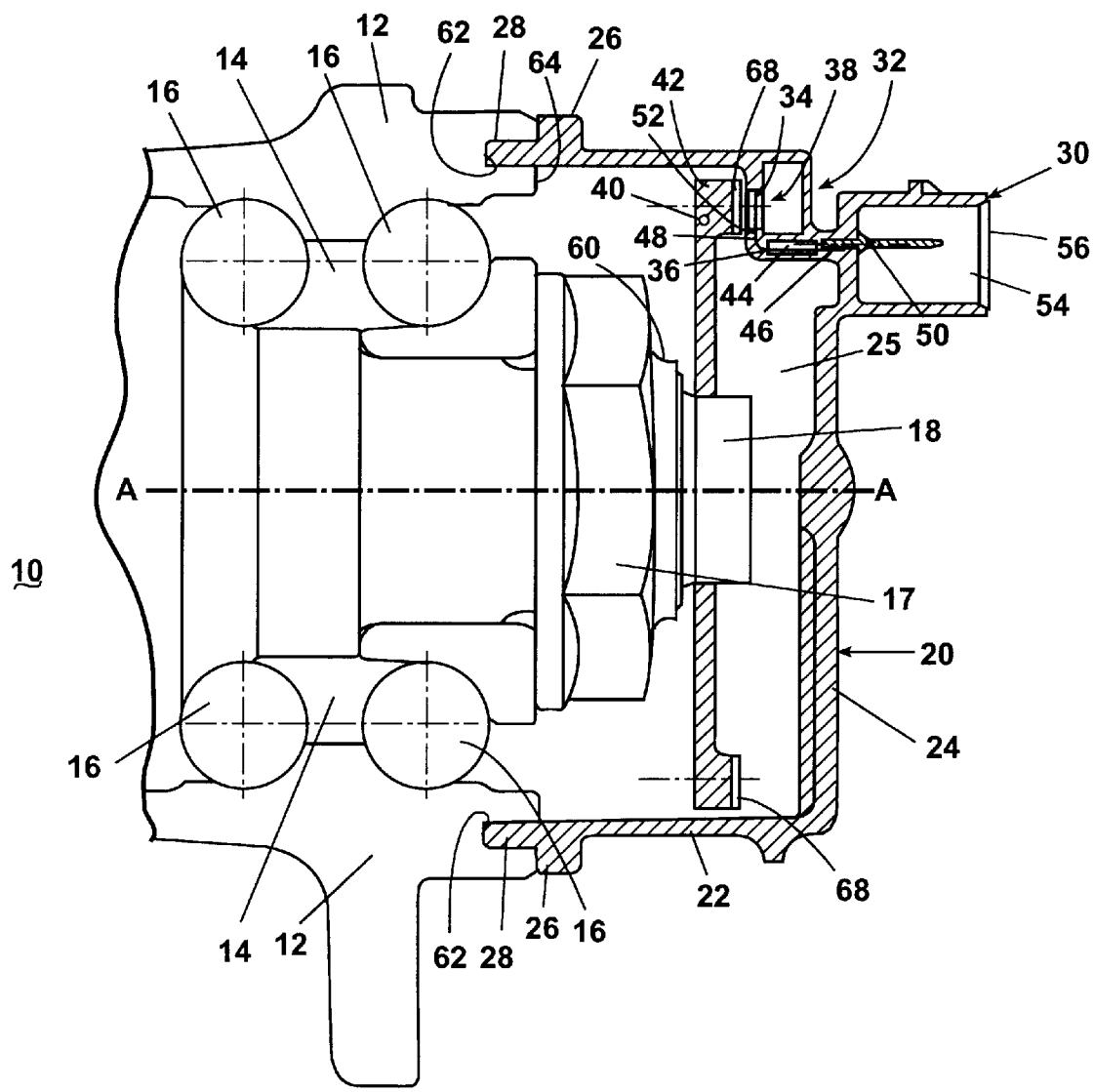
FIG. 2 is a longitudinal cross-sectional view of the wheel bearing assembly showing an alternative tone wheel that cooperates with the integral sensor.
Figure 3:
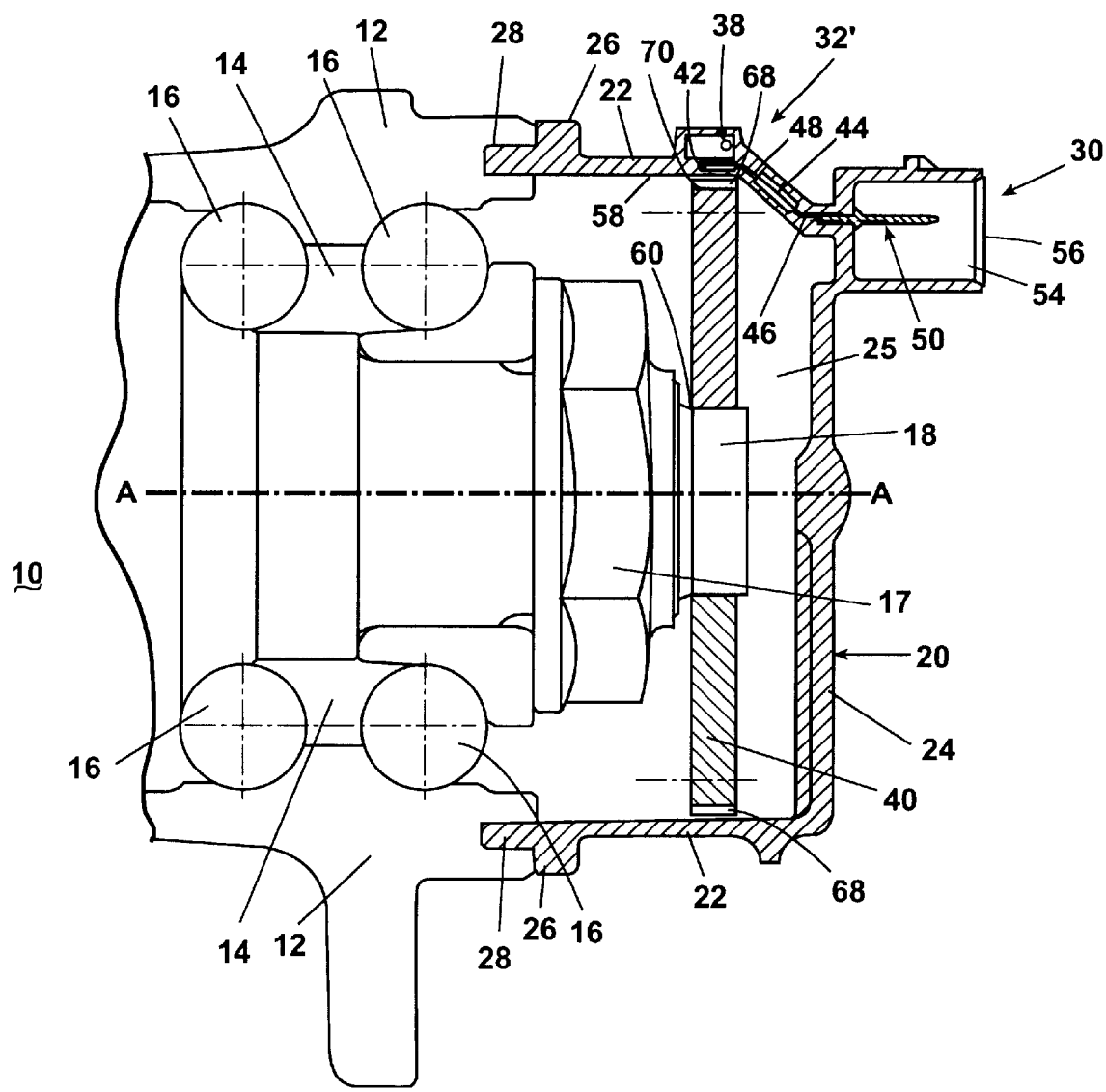
FIG. 3 is a longitudinal cross-sectional view of the wheel bearing assembly showing a second alternative tone wheel and the integral sensor in an alternative position.

FIGS. 1–3 show a wheel bearing assembly 10 that generally includes a wheel bearing outer ring 12, a wheel bearing inner ring 14, bearing balls 16, a nut 17 and a wheel bearing cap 20. A wheel axle 18 is seated within wheel bearing inner ring 14. The axis of rotation A—A of wheel bearing assembly 10 is represented by a dashed line.

In accordance with the present invention, wheel bearing cap 20 includes an annular wall 22 and a cover member 24. Annular wall 22 and cover member 24 cooperate to define a cavity 25. Annular wall 22 terminates in an annular support flange 26 and an annular engaging ring 28, to be explained below in further detail. Cover member 24 further includes a terminal housing 30 and a mounting member 32. Terminal housing 30 and mounting member 32 are integrally molded as part of wheel bearing cap 20.

Referring to FIGS. 1 and 2, a first preferred mounting member 32 is L-shaped and includes a first leg 34 and a second leg 36. First leg 34 is connected to annular wall 22 and second leg 36 is connected to terminal housing 30. Terminal housing 30 is connected to cover member 24 such that terminal housing 30 extends outwardly from bearing assembly 10.

Referring to FIG. 3, a second preferred mounting member 32' is positioned between annular wall 22 and terminal housing 30 at approximately a 45° angle.

To detect rotary and angular motion, wheel bearing assembly 10 is provided with a detection system that includes a sensor element 38 and a tone wheel 40. Sensor element 38 has a sensing face 42 and a signal conditioning integrated circuit 44 with electrical terminals 46. Sensor element 38 and circuit 44 are electrically connected together by electrical leads 48. Electrical terminals 46 are connected to connector pins 50. It is preferred that electrical terminals 46 are welded to connector pins 50. Connector pins 50 are adapted to engage a cable (not shown) to permit electrical communication between sensor element 38 and a microprocessor (not shown). Preferred connector pins 50 are blade-type connector pins. However, any suitable connector pins may be employed. A Phillips OH 191 sensor is preferred for this invention, however types of sensor elements may also be utilized.

A wide variety of known tone wheel configurations may be used with this invention. For example, it is contemplated that gear teeth (as shown in FIG. 3), parallel window, stamped wave-form window and magnetic encoder type tone wheels (as shown in FIG. 1) may be utilized without departing from this invention.

In accordance with the invention, sensor element 38 is overmolded into mounting member 32, 32' such that sensor element 38 is integral with wheel bearing cap 20, thereby eliminating the need for additional fasteners or clips. In a first embodiment, as shown in FIGS. 1 and 2, sensing face 42 is positioned on first leg 34 so as to be flush with an internal surface 52 of first leg 34. Circuit 44 is molded into second leg 36 with electrical leads 48 connecting circuit 44 to sensing element 38. Electrical terminals 46 extend away from circuit 44 and engage with connector pins 50. Connector pins 50 are positioned within a cavity 54 defined by terminal housing 30. Terminal housing 30 has an opening 56 to receive the cable that permits the electrical communication between sensor element 38 and the microprocessor.

In a second embodiment, as shown in FIG. 3, sensing face 42 is positioned along annular wall 22 so as to be flush with an interior surface 58 of annular wall 22, adjacent mounting member 32'. Circuit 44 is molded into mounting member 32' with electrical leads 48 connecting circuit 44 to sensing element 38. Electrical terminals 46 extend away from circuit 44 and engage with connector pins 50, similar to that which is described above in connection with FIGS. 1 and 2.

In operation, tone wheel 40 is fixedly attached to wheel axle 18. Preferably, tone wheel 40 has an engaging aperture 60 that permits tone wheel 40 to be press-fit onto axle 18 without requiring any additional fastener elements. Because tone wheel 40 is fixedly attached to axle 18, tone wheel 40 rotates at the same speed as axle 18. Wheel bearing cap 20 is next positioned over tone wheel 40 such that tone wheel 40 freely rotates inside cavity 25 of wheel bearing cap 20. Engaging ring 28 is sealed into an annular groove 62 formed in wheel bearing outer ring 12 such that support flange 26 engages a mounting surface 64 of wheel bearing outer ring 12. In one preferred embodiment, as seen in FIG. 1, first leg 34 with sensing face 42 of sensor element 38 is positioned adjacent to an exterior surface 66 of tone wheel 40 so as to be aligned with data generating sections 68 that are disposed on exterior surface 66.

In a second embodiment, as seen in FIG. 2, first leg 34 with sensing face 42 of sensor element 38 is positioned adjacent to an exterior surface 66 of tone wheel 40 so as to be aligned with data generating sections 68 that are disposed on gear teeth 69.

Referring to FIG. 3, where data generating sections 68 are disposed on an outer edge surface 70 of tone wheel 40, sensing face 42 of sensor 38 is positioned adjacent to edge surface 70 of tone wheel 40. As the vehicle wheel rotates, tone wheel 40 passes sensor element 38. A square-wave current signal is then generated by circuit 44 and transmitted to the microprocessor via connector pins 50. The microprocessor then translates the current signal into wheel bearing angular velocity.

Because sensor element 38 is molded to wheel bearing cap 20, a reduction in components is achieved, translating into a reduction of costs. Further, circuit 44, electrical leads 48 and electrical terminals 46 are advantageously protected as those components are integrally molded inwardly from internal and external surfaces of the wheel bearing cap 20, thereby eliminating dust and other contaminants from damaging the sensor element 38.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A wheel bearing assembly having a sensor assembly for detecting wheel bearing angular velocity, comprising:
   a wheel bearing cap having, annular wall, a cover member, an integral mounting member and a terminal housing;
   a sensor assembly integrally connected to said mounting member; and
   a tone wheel that is fixedly connected to a wheel axle so as to rotate with said wheel axle when said wheel axle is in operation;
   wherein said wheel bearing cap connects to a mating component that houses said wheel axle such that said tone wheel is received in a cavity defined by said wheel bearing cap with said sensor assembly positioned adjacent to said tone wheel so as to collect and transmit data from data generating surfaces on said tone wheel when said tone wheel rotates to determine the wheel bearing angular velocity,
   wherein said sensor assembly is overmolded to said mounting member,
   wherein said sensor assembly includes a sensor element having a sensing face electrically connected to a circuit by electrical leads and electrical terminals that are integrally connected to connector pins,
   wherein said sensor element is positioned adjacent to said mounting member such that said sensing face is flush with an interior surface of said annular wall, wherein said circuit, electrical leads and electrical terminals being integrally connected to said mounting member,
   wherein said mounting member is positioned at approximately a 45° degree angle with respect to said annular wall.

2. The wheel bearing assembly of claim 1, wherein said circuit, electrical leads and electrical terminals are integrally molded within said mounting member such that said circuit, electrical leads and electrical terminals are not exposed, said sensing face being flush with an interior surface of said wheel bearing cap so as to be operatively positioned adjacent to said tone wheel when said wheel bearing cap is connected to said mating component.

3. The wheel bearing assembly of claim 1, wherein said electrical terminals are welded to said connector pins prior to said sensor assembly being overmolded to said wheel bearing cap.

4. The wheel bearing assembly of claim 1, wherein said connector pins extend within said terminal housing such that a cable may be connected to said connector pins to transmit data to a microprocessor.

5. The wheel bearing assembly of claim 1, wherein said mounting member has a first leg and a second leg, said first leg positioned adjacent said annular wall and said second leg being positioned adjacent said terminal housing, wherein said sensor element is integrally molded to said first leg, and said circuit is integrally molded to said second leg.

6. The wheel bearing assembly of claim 5, wherein said mounting member is L-shaped.

7. The wheel bearing assembly of claim 1, wherein said annular walls further include a retaining ring and an annular support flange, said retaining ring being receivable in sealing engagement with a corresponding groove formed in said mating component, said support flange engaging a support surface on said mating component.

8. The wheel bearing assembly of claim 1, wherein said data generating surfaces are disposed adjacent a peripheral edge on an exterior surface of said tone wheel so as to be facing an internal surface of said cover member of said wheel bearing cap.

9. The wheel bearing surface of claim 8, wherein said data generating surfaces are disposed on gears.

10. The wheel bearing assembly of claim 1, wherein said data generating surfaces are disposed on a peripheral outer surface of said tone wheel so as to be facing an internal surface of said annular wall.

11. A wheel bearing cap assembly having a sensor assembly for detecting wheel angular velocity, comprising:

a wheel bearing cap having, annular wall, a cover member, an integral mounting member and a terminal housing;

a sensor assembly integrally connected to said mounting member; and wherein said wheel bearing cap is adapted to connect to a mating component that houses a tone wheel, wherein said sensor assembly collects and transmits data from data generating surfaces on said tone wheel when said tone wheel rotates to determine the wheel angular velocity, wherein said sensor assembly is overmolded to said mounting member, wherein said sensor assembly includes a sensor element having a sensing face electrically connected to a circuit by electrical leads and electrical terminals that are integrally connected to connector pins, wherein said sensor element is positioned adjacent to said mounting member such that said sensing face is flush with an interior surface of said annular wall, wherein said circuit, electrical leads and electrical terminals being integrally connected to said mounting member, wherein said mounting member is positioned at approximately a 45° degree angle with respect to said annular wall.

12. The wheel bearing cap assembly of claim 11, wherein said circuit, electrical leads and electrical terminals are integrally molded within said mounting member such that said circuit, electrical leads and electrical terminals are not exposed, said sensing face being flush with an interior surface of said wheel bearing cap so as to be operatively positioned adjacent to said tone wheel when said wheel bearing cap is connected to said mating component.

13. The wheel bearing cap assembly of claim 11, wherein said electrical terminals are welded to said connector pins prior to said sensor assembly being overmolded to said wheel bearing cap.

14. The wheel bearing cap assembly of claim 11, wherein said connector pins extend within said terminal housing such that a cable may be connected to said connector pins to transmit data to a microprocessor.

15. The wheel bearing cap assembly of claim 11, wherein said mounting member has a first leg and a second leg, said first leg positioned adjacent said annular wall and said second leg being positioned adjacent said terminal housing, wherein said sensor element is integrally molded to said first leg, and said circuit is integrally molded to said second leg.

16. The wheel bearing cap assembly of claim 15, wherein said mounting member is L-shaped.

17. The wheel bearing cap assembly of claim 11, wherein said annular walls further include a retaining ring and an annular support flange, said retaining ring being receivable in sealing engagement with a corresponding groove formed in said mating component, said support flange engaging a support surface on said mating component.

18. The wheel bearing cap assembly of claim 11, wherein said data generating surfaces are disposed adjacent a peripheral edge on an exterior surface of said tone wheel so as to be facing an internal surface of said cover member of said wheel bearing cap.

* * * * *